(12) United States Patent
Winter et al.

(10) Patent No.: US 8,708,857 B2
(45) Date of Patent: Apr. 29, 2014

(54) DRIVE UNIT, PARTICULARLY REAR DRIVE UNIT, FOR AN ALL-WHEEL DRIVE OF A MOTOR VEHICLE

(75) Inventors: Franz Winter, Mainz (DE); Veit Held, Bensheim (DE); Richard Starck, Falkenstein (DE); Uwe Rued, Ginsheim (DE)

(73) Assignee: GM Global Technology Operations LLC, Detroit, MI (US)

(*) Notice: Subject to any disclaimer, the term of this patent is extended or adjusted under 35 U.S.C. 154(b) by 227 days.

(21) Appl. No.: 13/309,620

(22) Filed: Dec. 2, 2011

(65) Prior Publication Data
US 2012/0142487 A1 Jun. 7, 2012

(30) Foreign Application Priority Data
Dec. 6, 2010 (DE) .......... 10 2010 053 414

(51) Int. Cl.
*F16H 37/06* (2006.01)
(52) U.S. Cl.
USPC .......................................... 475/221; 475/332
(58) Field of Classification Search
CPC .... F16H 37/082; F16H 37/0833; F16H 48/36
USPC ........................................ 475/203, 221, 332
See application file for complete search history.

(56) References Cited

U.S. PATENT DOCUMENTS

| | | | | |
|---|---|---|---|---|
| 3,403,742 A | * | 10/1968 | Stieg | 180/24.09 |
| 5,989,142 A | * | 11/1999 | Satzler | 475/150 |
| 7,044,880 B2 | | 5/2006 | Bowen | |
| 2009/0192006 A1 | | 7/2009 | Boeck et al. | |

FOREIGN PATENT DOCUMENTS

| | | |
|---|---|---|
| DE | 10359130 A1 | 7/2005 |
| DE | 102006025062 A1 | 12/2007 |
| DE | 102006031089 A1 | 1/2008 |
| WO | 2005116489 A2 | 12/2005 |

* cited by examiner

*Primary Examiner* — Edwin A Young
(74) *Attorney, Agent, or Firm* — Ingrassia Fisher & Lorenz, P.C.

(57) ABSTRACT

A drive unit, such as a rear drive unit, for a motor vehicle, such as an all-wheel drive motor vehicle, includes, but is not limited to two drive shafts, of which one drive shaft serves for driving the one wheel and the other drive shaft serves for driving the other wheel of a motor vehicle. Also provided is a transmission operationally connected to the drive shafts, through which a drive torque acting on the input of the transmission can be divided or is divided into at least two output torques and through which the output torque of the transmission acting on the one drive shaft is reversible or is reversed in its operation direction relative to the output torque of the transmission acting on the other drive shaft.

14 Claims, 3 Drawing Sheets

DRIVE UNIT, PARTICULARLY REAR DRIVE UNIT, FOR AN ALL-WHEEL DRIVE OF A MOTOR VEHICLE

CROSS-REFERENCE TO RELATED APPLICATION

This application claims priority to German Patent Application No. 10 2010 053 414.5-26, filed Dec. 6, 2010, which is incorporated herein by reference in its entirety.

TECHNICAL FIELD

The technical field relates to a drive unit, particularly rear drive unit, for an all-wheel drive of a motor vehicle. The technical field furthermore relates to a motor vehicle with such a drive unit, and also relates to an all-wheel drive.

BACKGROUND

An all-wheel drive in a motor vehicle serves for the improvement of the traction, in order for example to make possible or at least favor a certain off-road capability of the vehicle. By driving all wheels in contact with the ground, the slip of each individual wheel is minimized. An all-wheel drive is therefore frequently installed in vehicles that were designed for a use in difficult terrain or on unpaved roads. In addition to off-road vehicles, the all-wheel drive is increasingly employed also in pure road vehicles. Because of the increased traction, the all-wheel drive then offers the possibility of optimally transmitting the motor outputs that are on the increase today and thus improve the driving stability of the vehicle. However, the components that are additionally installed in a vehicle with all-wheel drive result in that the vehicle with all-wheel drive has a higher vehicle weight compared with a vehicle without all-wheel drive, resulting in a certain additional consumption of fuel.

During the course of new developments, the aim therefore is an all-wheel drive that has a reduced additional consumption of fuel. In addition, the aim also is a further improvement of the driving dynamics of vehicles with all-wheel drive. At least one object is to provide a drive unit, particularly rear drive unit, particularly for an all-wheel drive of a motor vehicle with the features mentioned at the outset, through which a vehicle with low additional consumption of fuel and an improved dynamic behavior can be realized. In addition, other aims, objects, desirable features, and characteristics will become apparent from the subsequent summary and detailed description, and the appended claims, taken in conjunction with the accompanying drawings and this background.

SUMMARY

A drive unit, particularly rear drive unit, particularly for an all-wheel drive of a motor vehicle is provided that comprises two drive shafts, of which one drive shaft serves for driving the one wheel and the other drive shaft for driving the other wheel of a motor vehicle, particularly of a common axle unit or axle assembly of a motor vehicle, such as for example the front axle or rear axle. To this end, one of the drive shafts can be preferably connected to the one wheel and the other drive shaft to the other wheel in a rotationally fixed manner. The drive unit can be installed for example in an all-wheel drive of an automobile, particularly passenger car or commercial vehicle. Here, the all-wheel drive is preferably of a mechanical type.

The drive unit comprises a transmission that can be operationally connected or is operationally connected to the drive shafts, through which transmission a drive torque acting on the input of the transmission can be divided or is divided into at least two drive torques and through which the drive torque of the transmission acting on the one drive shaft can be reversed or is reversed in its operational direction compared with the drive torque of the transmission acting on the other drive shaft. This measure produces an improved dynamic driving behavior of a motor vehicle, since through the output torques acting opposite in their operation direction the yaw angle of the vehicle is influenced. On the one wheel or the one drive shaft a drive torque acts, which is opposed to the drive torque on the other drive shaft, a steering action having a specifically supporting effect is generated. Because of this, the dynamic driving behavior of a vehicle, particularly in rapidly negotiated curves, is improved and thus the risk reduced, that the driver himself loses the control over the vehicle in such an extreme situation.

By dividing or branching the drive torque into the at least two output torques the motor for generating the drive torque can be dimensioned with lower output than with a drive of the drive shafts by a motor assigned in each case. It has furthermore been shown that the traction of the vehicle, particularly at low driving speed, is substantially improved.

The output torques acting on the drive shafts in opposite directions to each other have an over-steering or under-steering effect particularly when the motor vehicle negotiates a curve, depending on whether an output torque is applied to the wheel on the inside of the curve or to the wheel on the outside of the curve, which output torque acts opposite to the driving movement of the motor vehicle.

Through the drive unit, it is thus possible, because of the drive torques acting in opposite directions, to influence the driving behavior of the motor vehicle in such a manner that the motor vehicle no longer over-steers or under-steers when negotiating a curve. Preferably, the left wheel and the right wheel of a common axle assembly of the motor vehicle are driven by the drive unit according to the invention. Preferably, the drive unit is employed as rear drive unit. The left rear wheel and the right rear wheel are driven by the drive unit. It is obviously likewise conceivable that the drive unit is a front drive unit, through which the left front wheel and the right front wheel are driven.

It is appropriate that the transmission is designed to divide the drive torque into two-output torques of the same size or substantially the same value. Such a transmission with two-output torques of the same amount can be realized in manufacturing terms with relatively little expenditure, since same transmissions can be utilized in order to divide the drive torque equally over the output torques. Preferably, the transmission is of a mechanical type. It is also conceivable that the transmission is of an electric or electronic type.

A shifting device is provided, through which the force flow of the drive unit to the input of the transmission can be interrupted. By decoupling the transmission from the force flow of the drive unit the motor of the drive unit generating the force flow and the transmission modules and other mechanical components connected downstream of the motor if applicable are separated from the transmission. During driving movement of a vehicle, the number of the rotating parts of the drive unit is reduced as a result, when the force flow towards the transmission is interrupted by the shifting device. Thus, reduced forces of inertia oppose the moving of the vehicle, so that during the rolling of the vehicle a smaller dimension of friction torques or drag torques has to be overcome.

The shifting device is preferably of the mechanical type. The shifting device can be of a non-positive connection design, for example a friction clutch. The shifting device can also be of a positive connection design, for example a claw clutch. A shifting device designed as clutch can be provided with or without synchronizing gear or synchronizing stage. Such a clutch can also be designed with or without additional actuator. The shifting device can be of the self-shifting or externally shifting type.

A transmission that can be operationally connected or is operationally connected to the drive shafts through which a drive torque acting on the input of the transmission can be divided or is divided into at least two output torques acting in the same direction, of which one output torque acts on the one drive shaft and another output torque on the other drive shaft. Because of this, the drive torque for generating a propelling force of the motor vehicle is utilized in order to move the motor vehicle in driving direction, particularly in forward driving direction or reverse driving direction. Because of this, the transmission during the course of the invention is also called traction transmission.

Preferably, the traction transmission or the transmission, through which the drive torque is divided into the two-output torques acting in the same direction is designed as differential gear. Through the differential gear, the drive shafts thus transmit the same force onto the wheels connected to these. The circumferential velocities of the wheels can adjust themselves freely; merely a motor of the drive unit generating the force flow or the rotary movement predetermines the sum of the velocities of the drive shafts or the wheels. Thus, a high driving comfort, particularly when negotiating curves, is achieved. The differential gear can be a mechanical differential gear or an electric differential gear, which is preferably designed as axle differential. The differential gear can furthermore be a locking differential. A locking differential is a special differential gear that serves to reduce slip on that wheel having the lower ground adhesion in such a manner that the locking differential either stiffens the drive line or distributes more torque to the wheel having the better ground adhesion.

It is also conceivable that two differential gears are provided, of which the one differential gear is a locking differential. Here, the differential gear or the locking differential can be optionally activated or deactivated. It is furthermore conceivable that the differential gear additionally comprises a locking differential stage that can be activated. In addition to the differential gear a differential lock can also be provided, which can be activated as required.

A shifting device is provided, through which the force flow of the drive unit towards the input of the traction transmission can be interrupted. A separation of the traction transmission from the force flow of the drive unit can for example be carried out if the drive unit is designed as an all-wheel drive and the traction of the vehicle is to be exclusively generated by the front wheel drive. Through the decoupling of the traction transmission from the force flow of the drive unit the motor of the drive unit generating the force flow and the transmission modules and other mechanical components connected downstream of the motor if applicable are separated from the traction transmission. In driving mode of a vehicle, the number of the rotating parts of the drive unit is thus reduced, when the force flow towards the traction transmission is interrupted by the shifting device. Because of this, lower forces of inertia thus oppose the moving of the vehicle, so that during the rolling of the vehicle a smaller dimension of friction torques or drag torques has to be overcome.

The shifting device is preferably of a mechanical type. The shifting device can be of the non-positive connection design, for example as friction clutch. The shifting device can also be of the positive connection design, for example a claw clutch. A shifting device designed as clutch can be provided with or without synchronizing gear or synchronizing stage. Such a clutch can also be designed with or without additional actuator. The shifting device can be of the self-shifting or externally shifting type.

A shifting device is provided, through which the force flow of the drive unit can be directed or is directed optionally to the input of the one transmission or traction transmission or to the input of the other transmission. This provides a vehicle with a particularly favorable dynamic driving behavior since by means of the shifting device the output torque generated on the one drive shaft compared with the output torque generated on the other drive shaft can act in the same direction or in opposite direction depending on requirement. Through the shifting device it can thus be controlled if the traction transmission is active and thus a propelling force for propelling the motor vehicle is generated, or if the other transmission is active, which through the generation of the output torques acting in opposite direction to each other influences the yaw torque of the motor vehicle and thus generates a steering effect. Through the shifting device, the drive shafts can be flexibly activated. This makes possible an optimum adaptation to a currently travelled terrain, in that the traction transmission is activated optionally and depending on requirement. Because of this, reduced fuel consumption is furthermore achieved.

Preferably, the shifting device is designed to interrupt the force flow onto the drive shafts in a neutral position. The shifting device is thus designed also for decoupling the force flow from the drive shafts. In the neutral position, the motor and any gear units or such like components connected downstream are decoupled from the drive shaft so that for moving a vehicle a smaller number of components are put into rotary motion. The inertia effect through rotating parts in driving mode of a vehicle is reduced because of this. Because of this, reduced friction torques are likewise obtained, so that this measure aims at a reduction of the fuel consumption.

In the neutral position, the wheels connected to the drive shafts are not driven. In the case of an all-wheel drive, the drive of the vehicle then takes place via the other axle. If the drive unit is a rear drive unit, the drive of the vehicle in the neutral position is affected via the front wheels.

This shifting device, which can be shifted into three operating modes, is preferably of a mechanical type, particularly designed as clutch. The clutch can be a friction-connected clutch, for example in the manner of a friction clutch. The clutch can also be designed as a positively connected clutch, for example in the manner of a claw clutch. The shifting device can be designed with or without synchronizing gear. The shifting device can also be provided with or without actuator. The shifting device can be of the self-shifting or externally shifted type.

The transmission by means of which output torques acting in opposite direction are generated on the drive shafts is designed as planetary gear set. By means of the planetary set, which is also called planetary gear set, the dividing of the drive torque into two-output torques with opposite operating direction can be realized in a technically simple manner. Preferably, the planetary gear set comprises at least two sun gears, at least two internal gears and at least one planet gear rolling off or meshing with the internal circumference of the internal gears and on the outer circumference of the sun gears. For the sake of running stability in operation of the planetary gear set, at least two, preferentially three planet gears arranged distributed over the circumference are provided, which are located between the internal gears and the sun gears. Preferably, the at least one planet gear, the at least one sun gear and the at least one internal gear are substantially arranged coaxially with respect to the center axis of the planetary gear set.

It is appropriate that seen in axial direction, two planet gears are provided, which are arranged located one after the other and the center axes are each located coaxially with respect to a common axis of rotation. The at least one planet gear can be rotatably mounted on a planet carrier. The at least one planet gear can also be provided without planet carrier, so that the at least one planet gear is located between the outer circumference of at least one of the sun gears and the inner circumference of at least one internal gear in a floating manner, particularly braced between internal gear and sun gear. Insofar as seen in axial direction, two planet gears are mounted in a self-rotating manner about a common axis of rotation of which one planet gear is operationally connected to the one sun gear and the one internal gear and the other planet gear to the other internal gear and the other sun gear, these planet gears can be mounted on a common planet carrier.

One of the internal gears is assigned the input of the planetary gear set, the other one of the internal gears is designed fixed on the housing, the one of the sun gears is connected to one of the drive shafts in a rotationally fixed manner and the other one of the sun gears acts directly or indirectly, for example via an intermediate shaft, on the other one of the drive shafts. Because of this, the input of the planetary gear set is accessible from the outside, so that with regard to design the force flow generated by the motor of the drive unit can be routed to the input of the planetary gear set in a simple manner. In that, the outputs of the planetary gear set are assigned to the sun gears the outputs are located close to the center of the planetary gear set, so that an operational connection of the outputs to the output shafts can be realized in a technically simple manner. To this end, the intermediate shaft can for example be designed as internal shaft, within which a section of one of the drive shafts is guided, more preferably mounted.

It can also be provided that one of the sun gears is assigned the input of the planetary gear set, the other one of the sun gears is designed fixed to the housing, the one of the internal gears is connected to one of the drive shafts in a rotationally fixed manner and the other one of the internal gears acts directly or indirectly on the other one of the drive shafts. One of the sun gears is connected to an intermediate shaft designed as hollow shaft in a rotationally fixed manner, which intermediate shaft acts on the input of the traction transmission and within which one of the drive shafts, on which an output of the traction transmission is acting, is arranged.

At least one electric motor is provided, through which the transmission for the output torques acting in opposite direction and/or the transmission for the output torques acting in the same direction can be driven. In that the drive unit for driving the one transmission and/or the other transmission utilizes an electric motor, a mechanical wheel drive with particularly low fuel consumption can be realized through the drive unit. A substantial reduction of the fuel consumption is particularly achieved when the drive unit is a rear drive unit in a hybrid vehicle, which comprises an energy storage unit or a battery, from which the energy for operating the electric motor is provided.

It can be provided, that the one transmission and the other transmission can be driven by a common electric motor. Two electric motors can also be provided, of which one electric motor serves for driving the one transmission and the other electric motor for driving the other transmission. Furthermore, it is conceivable that the at least one electric motor serves for driving the transmission for the output torques acting in opposite direction and for the transmission, which generates output torques acting in the same direction, another drive type such as for example a combustion engine, a fuel cell drive or the like that is distinct from an electric drive can be provided as drive. It is substantial in this regard that the drive acting on the transmission for output torques acting in the same direction is designed so that a propelling force moving the vehicle can be generated. This drive can for example be dimensioned in such a manner that it serves as primary drive for moving the motor vehicle in driving direction. This drive as secondary drive can also be designed in order to permanently or activatably support the one existing primary drive in order to generate an optimum propelling force for moving the motor vehicle in driving direction.

In principle, it is also conceivable that for generating the drive torque, which acts on the transmission that generates the output torques acting in the opposite direction, a drive concept other than an electric motor is employed. To this end, any other desired drive system can obviously also be employed in order to influence the yaw angle of the motor vehicle by means of the transmission and thus bring about a steering effect. The drive system exerts a sufficiently large drive torque on the transmission in order to generate the output torques acting in opposite direction in a sufficient order of magnitude. It is appropriate that the electric motor, subject to the intermediate connection of at least one spur gear transmission, more preferably of a two-stage or three-stage spur gear transmission, acts on the one transmission or the other transmission or traction transmission, preferentially subject to the intermediate connection of the shifting device.

The drive unit comprises a trailing arm, on which the drive shafts support themselves directly or indirectly. Because of this, a sturdy axle design, namely the twist-beam axle is utilized in order to install the drive unit thereon, more preferably in order to support or mount the drive shafts of the drive unit. Thus, the drive unit can be mounted on a sturdy axle structure of the motor vehicle with little effort. The entire drive unit including the trailing arm can be pre-assembled as assembly so that as a result advantages during the final assembly of the motor vehicle also materialize. Preferably, the trailing arm forms the rear axle or at least a part of the rear axle, so that the drive unit serves a rear wheel drive, through which a propelling force for moving the motor vehicle in forward driving direction or reverse driving direction can be utilized as primary drive or secondary drive supporting the primary drive or through which a steering torque acting on the motor vehicle can be generated, which is achieved through the output torques acting in opposite direction.

An all-wheel drive with a drive unit of the type described above is also provided in accordance with an embodiment. An all-wheel drive as hybrid drive with a drive unit of the type described above is also provided in accordance with an embodiment. In this case, the motor vehicle preferably comprises a combustion engine, a drive such as a fuel cell drive or a drive other than an electric motor as primary drive. The drive unit of the type described above preferably serves as supporting secondary drive that is driven by an electric motor and in support of the primary drive generates a propelling force or traction for moving the motor vehicle in driving direction.

A motor vehicle is provided with all-wheel drive comprising a drive unit of the type described above.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
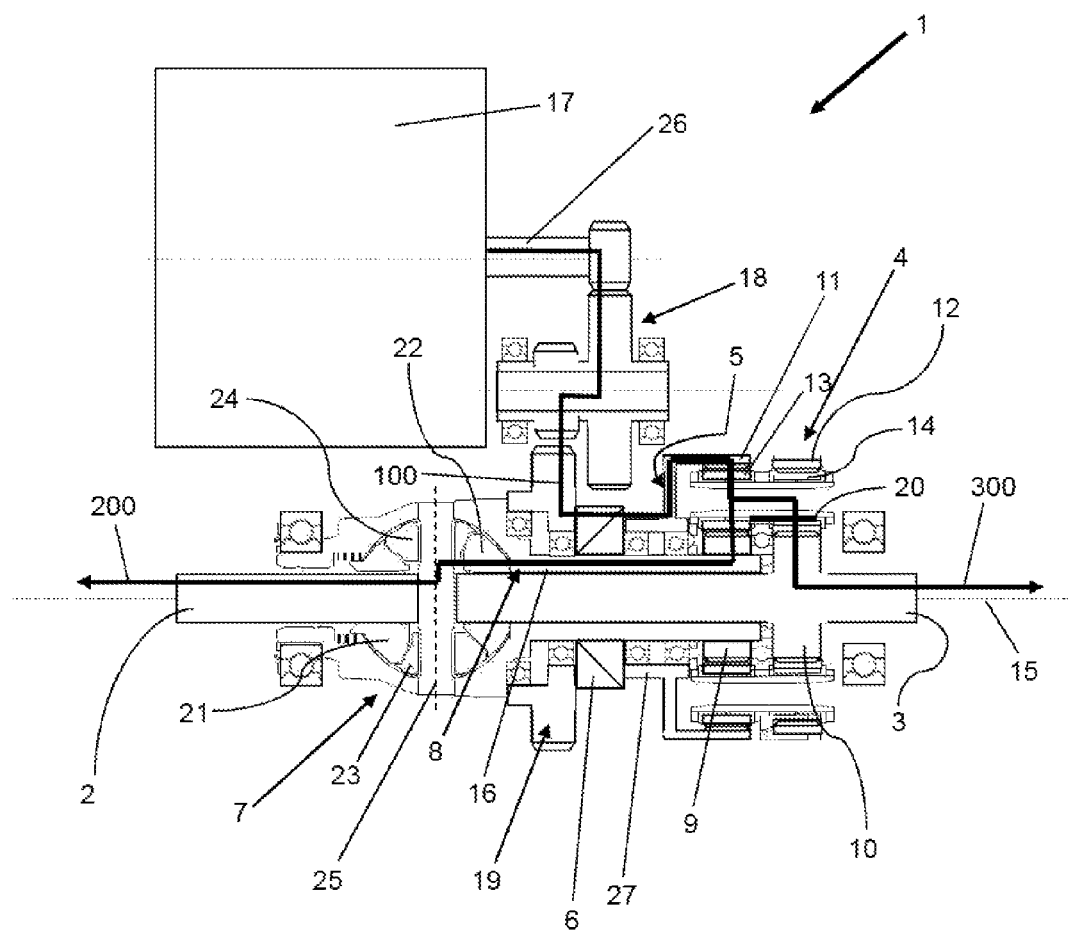
FIG. 1 is a possible embodiment of a drive unit for an all-wheel drive of a motor vehicle in section representation with drawn-in force flow in a first operating mode.
Figure 2:
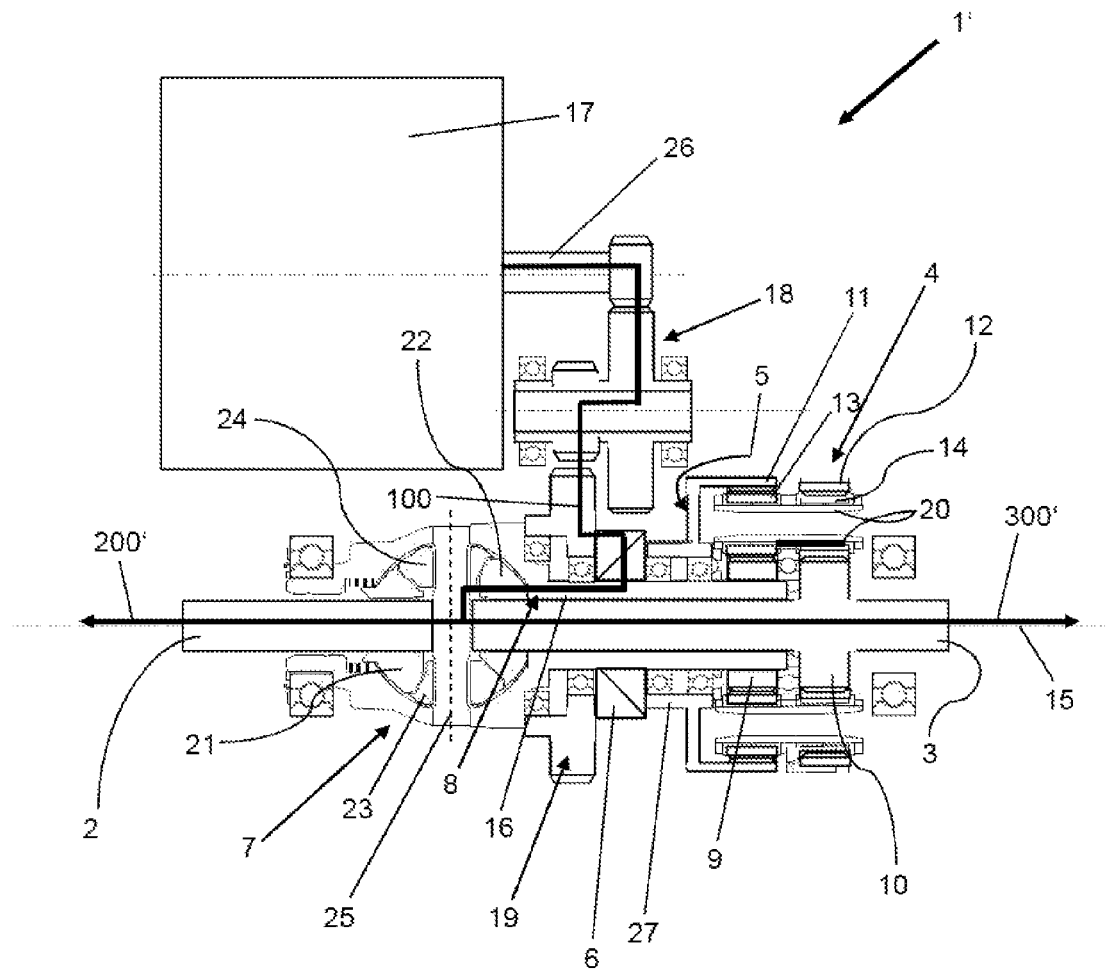
FIG. 2 is the drive unit according to FIG. 1 with drawn-in force flow in a second operating mode.

FIG. 1 and FIG. 2 show, in schematic representation, same possible embodiment of a drive unit 1, which is preferably provided for use as rear drive unit of an all-wheel drive of a motor vehicle. The drive unit 1 comprises two drive shafts 2, 3, of which one drive shaft 2 serves for driving the one wheel (not shown) and the other drive shaft 3 for driving the other wheel (not shown) of the motor vehicle. Preferably, the drive shafts 2, 3 are assigned to a common axle assembly for the motor vehicle.

The drive unit 1 furthermore comprises a motor, more preferably electric motor 17, through which the drive shafts 2, 3 can be driven. The drive shafts 2, 3 can be driven by means of the electric motor 17 in two ways, as is evident by means of the force flows drawn into the FIG. 1 and FIG. 2. In a first drive type (FIG. 2), the drive shafts 2, 3 are driven in the manner that an output torque 200' acting on the one drive shaft 2 acts in the same direction with respect to an output torque 300' acting on the other drive shaft 3. The two output torques 200' and 300' substantially have the same amount, i.e., the same output torque is transmitted on the drive shafts 2, 3. To this end, the drive unit 1 comprises a differential gear 7 known per se, through which a drive torque 100 acting on the input 8 of the differential gear is divided into the two equally acting output torques 200' and 300'. Through the differential gear 7, the circumferential velocities of the drive shafts 2, 3 or of the wheels (not shown) of the motor vehicle driven by these, for example driving in curves, can freely establish themselves. In this first drive type, the drive unit 1 serves for generating a propelling force or traction in order to move the motor vehicle in driving direction.

In a second drive type (FIG. 1), the drive shafts 2 and 3 are driven in the manner that an output torque 200 acting on the one drive shaft 2 is opposed in its operational direction with respect to the one output torque 300 acting on the other drive shaft 3. Because of this, the yaw angle of the motor vehicle with its all-wheel drive is actively influenced. Through the opposing output torques 200, 300, a steering effect is imparted on the motor vehicle in this second drive type, through which the dynamic driving behavior of the motor vehicle more preferably when negotiating curves is improved.

In order to be able to provide the output torques 200, 300 opposing each other on the drive shafts 2, 3 a transmission 4 is provided, which is designed as planetary gear set. Through the transmission 4, the drive torque 100 acting on the input 5 of the transmission 4 is divided into the two-output torques 200, 300 preferentially of the same amount, which in their operational direction are opposed to each other.

In order to be able to switch the drive unit 1 from the one operating mode into the other operating mode a shifting device 6 is provided, through which the force flow generated by the electric motor 17 can be optionally directed to the input 8 of the differential gear 7 or to the input 5 of the transmission 4. The shifting device 6 is preferably a mechanical clutch, for example a claw clutch with or without synchronizing gear.

Preferably, the shifting device 6 is designed to interrupt the force flow to the drive shafts 2, 3 generated by the electric motor 17 in a neutral position. In this case, the shifting device 6 can thus be operated in three modes. In a first operating mode, the force flow is directed to the differential gear 7 by means of the shifting device 6. In the second operating mode, the force flow is directed to the transmission 4 by means of the shifting device and in the third mode, the force flow is interrupted by means of the shifting device 6.

In order to realize the functioning method described above the drive unit 1 is preferably constructed as follows. The differential gear 7 and the transmission 4 or planetary gear set are with their respective transmission axis each arranged coaxially with respect to the center axis 15 of the drive unit 1 and are located at a distance from each other. The drive shaft 2 is connected in a rotationally fixed manner to a gear wheel 21, more preferably a bevel gear of the differential gear 7. Likewise, the drive shaft 3 is connected in a rotationally fixed manner to a gear wheel 22, particularly bevel gear of the differential gear 7. The gear wheels 21, 22 of the differential gear 7 in this case are located with their respective axis of rotation substantially coaxially with respect to the center axis 15 of the drive unit 1. The input 8 of the differential gear 7 is preferentially formed by the housing of the differential gear 7, which interacts with at least one preferentially two gear wheels 23, 24, preferably bevel gears, of the differential gear 7. The gear wheels 23, 24 are located with their axis of rotation substantially transversely to the center axis 15 of the drive unit 1, so that through a rotary movement of the housing of the differential gear 7 about the center axis 15 the gear wheels 23, 24 are co-rotated about the center axis 15 and in the process simultaneously rotate about their own gear wheel axis 25. In the process, the gear wheels 23, 24 roll on or mesh with the gear wheels 21, 22 that are connected to the drive shafts 2, 3 in a rotationally fixed manner.

The input 8 of the differential gear 7 is connected to an intermediate shaft 16 in a rotationally fixed manner, which intermediate shaft is designed as hollow shaft. The intermediate shaft 16 and the drive shaft 3 are located concentrically with respect to the center axis 15 of the drive unit 1, wherein the drive shaft 3 passes through the hollow space of the intermediate shaft 16 designed as hollow shaft, more preferably supports itself in a rotatable manner against the intermediate shaft 16.

The intermediate shaft 16 in turn is operationally connected to the shifting device 6, in particular, a part of the shifting device 6 can be connected to the intermediate shaft 16 in a rotationally fixed manner. The shifting device 6 in turn is operationally connected to a gear wheel of a spur gear transmission 19 driven by the electric motor 17, in particular, a component of the shifting device 6 can be connected to the gear wheel of the spur gear transmission 19 in a rotationally fixed manner. Between the output shaft 26 of the electric motor 17 and the spur gear transmission 19 a further spur gear transmission 18 can be connected.

The transmission 4 or planetary gear set has two sun gears 9, 10, which are arranged located one after the other seen in the direction of the center axis 15 and are located coaxially with respect to the center axis 15. The one sun gear 9 is connected to the intermediate shaft 16 and the other sun gear 10 to the drive shaft 3 in a rotationally fixed manner. The sun gears 9, 10 thus form the outputs of the transmission 4.

The transmission 4 or planetary gear set furthermore has two internal gears 11, 12, which are arranged one behind the other seen in the direction of the center axis 15 and are located coaxially with respect to the center axis 15. Between the internal gear 11 and the sun gear 9, at least two planet gears 13 are provided whose teeth mesh with the internal teeth of the internal gear 11 and the outer teeth of the sun gear 9. Furthermore, between the internal gear 12 and the sun gear 10 at least two planet gears 14 are provided, whose teeth mesh with the internal teeth of the internal gear 12 and the outer teeth of the sun gear 10. The planet gears 13, 14 are arranged located one behind the other seen in the direction of the center axis 15 and rotatably mounted on a common planet carrier 20 thereon. It is also conceivable that at least one of the planet gears 13, 14 of the two planet gears 13, 14 is arranged on the common planet carrier 20 in a rotationally fixed manner One of the two internal gears 11, 12, preferentially the internal gear 11, forms the input 5 of the transmission 4 and can be operationally connected to the shifting device 6 via a shaft section 27, and is more preferably connected to a component of the shifting device 6 in a rotationally fixed manner. The other of the internal gears 11, 12, preferentially the internal gear 12 is connected to the housing (not shown) of the drive unit 1 in a rotationally fixed manner.

FIG. 1 shows the force flow for the operating state of the drive unit 1, in which the shifting device 6 is shifted in the operating mode with the output torques 200, 300 on the drive shafts 2, 3 acting in opposite directions. As is evident from the continuous force flow line, the drive unit 1 in this operating state of the drive unit 1 the spur gear transmission 18 is driven by the electric motor or its output shaft 26, wherein the spur gear transmission 18 in turn drives the spur gear transmission 19.

From the spur gear, transmission 19 the drive torque 100 is transmitted to the shifting device 6, which in the present operating mode passes the drive torque 100 on to the shaft section 27 and the internal gear 11 molded thereon. From the internal gear 11 of the transmission 4 or the planetary gear set 4 the drive torque 100 is divided into the two output torques 200, 300 preferentially of the same amount by means of the planet gears 13, 14 and the one output torque 200 via the one sun gear 9 and the intermediate shaft 16 and the differential gear 7 passed on to the drive shaft 2. The other output torque 300 is passed on to the other drive shaft 3 via the sun gear 10. Here, the output torque 300 on the drive shaft 3 has the same operational direction as the drive torque 100 as the input 5 of the transmission 4. The output torque 200 on the drive shaft 2 by contrast has an operational direction that is opposed to the output torque 300 or the drive torque 100.

FIG. 2 shows the force flow of the drive unit 1 in that operating state, in which the shifting device 6 is shifted into the operating mode for generating the output torques 200', 300' acting in the same direction. The force flow runs from the electric motor 7 as far as to the shifting device 6 in the same manner as in the operating mode of the drive unit 1 described above. From the shifting device 6, the force flow or the torque is passed on to the intermediate shaft 16 and then forms the drive torque 100 at the input 8 of the differential gear 7. Through the differential gear 7, a division of the drive torque 100 into the two-output torques 200', 300' of the same amount takes place that act on the respective drive shaft 2 and 3. The output torques 200' and 300' are generated by the differential gear 7 acting in the same operational direction.

In the neutral position of the shifting device 6 that is not shown in the FIG. 1 and FIG. 2 the intermediate shaft 16 and the shaft section 27 are decoupled from the shifting device 6, so that the force flow to both the differential gear 7 as well as the transmission 4 or the planetary gear set is interrupted. In the neutral position, the wheels (not shown) which are arranged on the drive shafts 2, 3 are not driven by the drive unit 1. The mode of operation of the drive unit 1 is described in the following on the example of a motor vehicle with all-wheel drive, which is moved through the primary drive in forward driving direction and is negotiating a curve.

The drive unit 1 for example is deactivated first. The shifting device 6 of the drive unit 1 to this end is in the neutral position. The force flow both to the differential gear 7 as well as to the transmission 4 or the planetary gear set is interrupted. The electric motor 17 can be additionally switched off in the neutral position. In order to improve the driving behavior of the motor vehicle when negotiating curves the shifting device 6 can be shifted from the neutral position in the manner that the drive unit 1 is in the second drive mode. The drive unit 1 is then in a steering mode. The force flow generated by the electric motor 17 is directed to the planetary gear set 4. The rotary movement of the electric motor 17 acts on the internal gear 11, which forms the input of the planetary gear set 4. The transmission of the rotary movement from the internal gear 11 to the further components of the planetary gear set 4 and from there to the drive shafts 2, 3 is then effected as already described above. Through the direction of rotation of the electric motor 17 it can be influenced in this drive mode of the drive unit 1 and with the driving movement of the motor vehicle that happens to take place at that moment, if a torque that is directed in opposite direction to the direction of rotation of the wheels of the motor vehicle acts on the drive shaft 2 or on the drive shaft 3.

Preferably, the step-up or step-down transmission ratios of the components of the planetary gear set 4 are selected in such a manner that during straight-ahead driving of the motor vehicle and in the second drive mode of the drive unit 1 and electric motor 17 switched off, the wheels on the drive shafts 2 and 3 rotate with the same rotational speed and the internal gear 11 of the planetary gear set 4 is substantially free of a rotary movement relative to the locationally fixed internal gear 12. Insofar as the motor vehicle is negotiating a curve, a rotational speed differential between the two drive shafts 2 and 3 occurs, as a result of which the internal gear 11 starts to rotate either in the one direction or in the other direction relative to the locationally fixed internal gear 12. For as long as the electric motor 17 is switched off, the rotor (not shown) of the electric motor 17 is dragged along through the rotary movement of the internal gear 11. By energizing the electric motor 17, an acceleration of the internal gear 11 in the dragged direction or a braking of the internal gear 11 contrary to the dragged direction takes place depending on the direction of the generated torque of the electric motor 17 with the consequence that on the drive shaft 2 or the drive shaft 3 a torque is generated, which acts against the direction of rotation of the wheels of the motor vehicle moving in driving direction and the steering effect is thus generated through the drive unit 1.

Switching over the drive unit 1 from the second drive mode, the steering mode, to the first drive mode, the traction mode, brings about that through the shifting device 6 the force flow generated by the electric motor 17 is directed to the differential gear 7. Because of this, the same-direction output torques 200' and 300' are generated on the drive shafts 2 and 3 even when negotiating a curve, which have a supporting effect on the propelling force of the motor vehicle and thus support the locomotion in driving direction of the motor vehicle. Through the differential gear 7, the same forces are transmitted to the drive shafts 2, 3, whereas the angular velocity of the wheels connected to the drive shafts 2, 3 can freely establish itself. Upon a failure of the electric motor 17 in the traction mode, the rotor (not shown) of the electric motor 17 would be dragged along.

Figure 3:
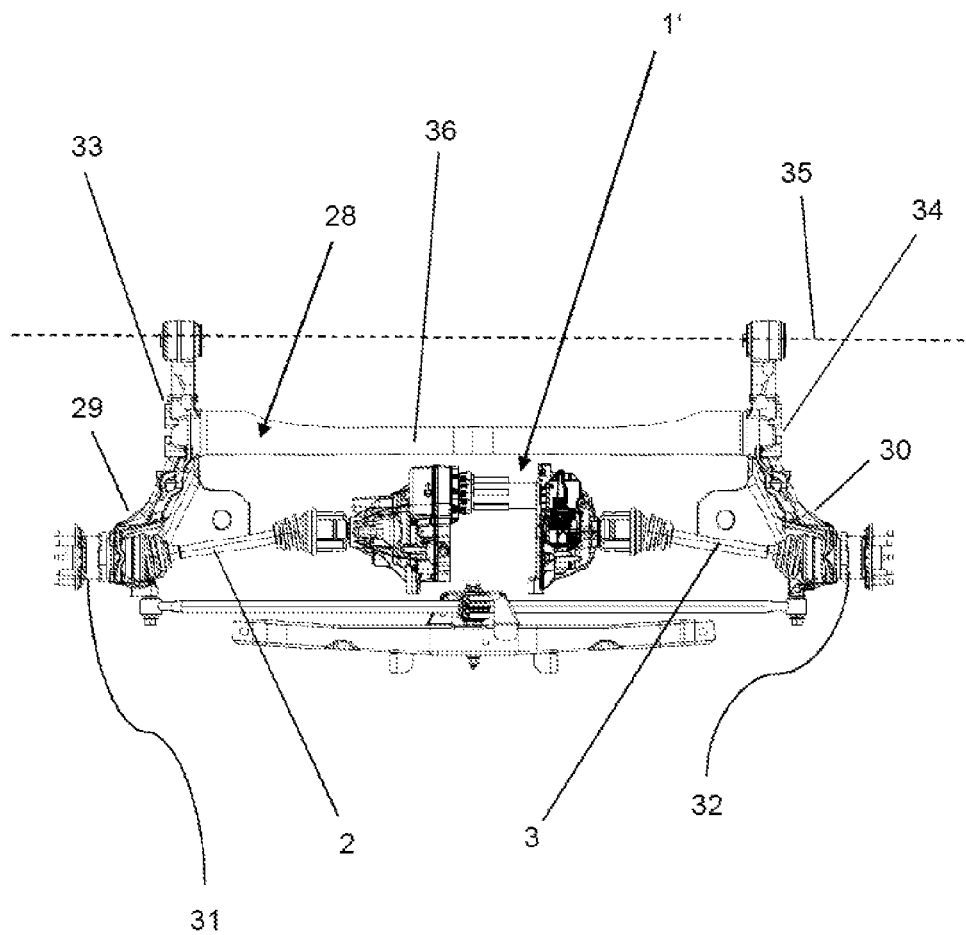
FIG. 3 is a further embodiment of a drive unit for an all-wheel drive of a motor vehicle in top view.

FIG. 3 shows, in schematic representation, a further possible embodiment of a drive unit 1'. Components of the drive unit 1' according to FIG. 3, which is identical to or functionally the same as the components of the drive unit 1 according to FIG. 1 and FIG. 2 are provided with same reference numbers, so that in this respect reference is made to the description regarding the drive unit 1 according to FIG. 1 and FIG. 2.

The drive unit 1' according to FIG. 3 differs from the drive unit 1 according to the FIG. 1 and FIG. 2 among other things in that a trailing arm 28 is provided, on which the drive shafts 2, 3 of the drive unit 1' support themselves. To this end, the trailing arm 28 preferentially has lateral leg sections 29, 30, in each of which a mounting 31, 32 is rotatably mounted, which serves for the mounting of a wheel (not shown) of the motor vehicle in a rotationally fixed manner. The mounting 31 is connected to the drive shaft 2 and the mounting 32 to the drive shaft 3 of the drive unit 1' in a rotationally fixed manner, so that a rotary movement generated by the drive unit 1' is transmitted to the wheels (not shown) of the motor vehicle via the drive shafts 2, 3 and the mountings 31, 32. The drive unit 1' with the trailing arm 28 forms a unit that can be preassembled, preferentially a rear axle unit for the motor vehicle that can be preassembled.

The trailing arm 28 consists of two drawn longitudinal swing arms 33, 34, which are preferentially interconnected near their axis of rotation 35 by a cross-link 36, preferentially transverse profile. The cross link 36 preferably has a substantially U or T-shaped cross section. Furthermore, the cross-link 36 is preferably dimensioned in such a manner that it twists during unilateral spring compression and extension and acts as stabilizer.

Through the drive unit, operating a motor vehicle in an all-wheel drive is made possible with low additional fuel consumption compared with the pure front-wheel drive or rear-wheel drive, particularly when the drive unit is designed as rear-wheel drive unit and is employed in a hybrid vehicle with energy storage unit. In addition to this, the drive unit makes possible driving with clearly improved driving dynamics of the motor vehicle compared with the conventional mechanical all-wheel drives, which is made possible because of the output torques acting in opposite directions between the left and the right wheel of the drive unit. Furthermore, the drive unit makes possible the use of an electric motor that is relatively small in output, which is adequate for an optimum drive of the drive unit. By operating the drive unit in the three different operating modes through the shifting device a particularly good traction at low speed of the vehicle materializes overall.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A drive unit of a motor vehicle, comprising:
    a first drive shaft configured to drive a first wheel of the motor vehicle;
    a second drive shaft configured to drive a second wheel of the motor vehicle; and
    a transmission operationally connected to the first drive shaft and the second drive shaft through which a drive torque acting on an input of the transmission is divisible into a first output torque and a second output torque through which an output torque of the transmission acting on the first drive shaft is reversible in an operational direction relative to the output torque of the transmission acting on the second drive shaft; and
    a shifting device through which a force flow of the drive unit towards the input of the transmission is interruptible.

2. The drive unit according to claim 1, further comprising a gear operationally connected to the first drive shaft and the second drive shaft through which the drive torque acting on the input of the gear is divisible into the first output torque and the second output torque acting in the same direction of which the first output torque is configured to act on the first drive shaft and the second output torque is configured to act on the second drive shaft.

3. The drive unit according to claim 2, wherein a force flow of the drive unit towards the input of the gear is interruptible through the shifting device.

4. The drive unit according to claim 2, wherein a force flow of the drive unit is optionally directed to the input of the gear through the shifting device.

5. The drive unit according to claim 2, wherein a force flow of the drive unit is optionally directed to the input of the transmission through the shifting device.

6. The drive unit according to claim 5, wherein the shifting device is configured to interrupt the force flow to the first drive shaft and the second drive shaft in a neutral position.

7. The drive unit according to claim 2, further comprising an electric motor through which the gear for the output torque acting in the same direction is driven.

8. The drive unit according to claim 7, wherein the electric motor is subject to an intermediate connection of at least one spur gear transmission and acts on the transmission.

9. The drive unit according to claim 1, wherein the transmission is a planetary gear set through which the first output torque and the second output torque acting in opposite directions are generated on the first drive shaft and the second drive shaft.

10. The drive unit according to claim 9, wherein the planetary gear set comprises at least two sun gears, at least two internal gears and at least one planet gear coupled with an inner circumference of the at least two internal gears and an outer circumference of the at least two sun gears.

11. The drive unit according to claim 10, wherein one of the at least two internal gears is assigned the input of the planetary gear set, the other of the at least two internal gears is designed in a manner fixed to a housing, the one the at least two sun gears is connected to one of the first drive shaft or the second drive shaft in a rotationally fixed manner and the other one of the at least two sun gears is configured to act on the other one of the first drive shaft or the second drive shaft via an intermediate shaft.

12. The drive unit according to claim 11, wherein one of the at least two sun gears is connected in the rotationally fixed manner to the intermediate shaft designed as hollow shaft, which acts on an input of another gear and one of the first drive shaft or the second drive shaft is arranged therein, on which an output of another gear is acting.

13. The drive unit according to claim 1, further comprising at least one electric motor through which the transmission for the output torque acting in opposite direction is driven.

14. The drive unit according to claim 1, wherein the drive unit comprises a trailing arm on which the first drive shaft and the second drive shaft are self-supporting.

* * * * *